(12) United States Patent
Dufal et al.

(10) Patent No.: US 6,324,591 B1
(45) Date of Patent: Nov. 27, 2001

(54) METHOD AND DEVICE PROVIDING TIME SYNCHRONIZATION BETWEEN A PROCESSING UNIT AND EXTERNAL MEANS

(75) Inventors: Frëdëric Dufal, Grenoble; Pierre-René Rogel, Acigne; Michel Remy, Saint-Martin-d'Hères, all of (FR)

(73) Assignee: France Telecom

(*) Notice: Subject to any disclaimer, the term of this patent is extended or adjusted under 35 U.S.C. 154(b) by 0 days.

(21) Appl. No.: 09/230,181
(22) PCT Filed: Jul. 16, 1997
(86) PCT No.: PCT/FR97/01320
  § 371 Date: Jan. 15, 1999
  § 102(e) Date: Jan. 15, 1999
(87) PCT Pub. No.: WO98/03922
  PCT Pub. Date: Jan. 29, 1998

(30) Foreign Application Priority Data

Jul. 18, 1996 (FR) .................................................. 96 09018

(51) Int. Cl.⁷ .................................. G06F 1/04; G06F 9/00
(52) U.S. Cl. ........................... 709/400; 713/400; 713/600
(58) Field of Search ..................................... 713/400, 503, 713/600; 709/400

(56) References Cited

U.S. PATENT DOCUMENTS

| | | | | |
|---|---|---|---|---|
| 3,564,161 | * | 2/1971 | Takishima | 360/72.2 |
| 4,315,308 | * | 2/1982 | Jackson . | |
| 5,333,299 | * | 7/1994 | Koval et al. | 713/400 |
| 5,689,689 | * | 11/1997 | Meyers et al. | 709/400 |
| 5,794,002 | * | 8/1998 | Rosen | 712/205 |

FOREIGN PATENT DOCUMENTS 0 417 878 * 3/1991 (EP) .
0 462 622 * 12/1991 (EP) .
0 707 260 * 4/1996 (EP) .

OTHER PUBLICATIONS

International Search Report for Application No. PCT/FR97/01320 mailed Dec. 3, 1997.*
International Preliminary Examination for Application No. PCT/FR97/01320 mailed Mar. 13, 1998.*

* cited by examiner

Primary Examiner—Dennis M. Butler
(74) Attorney, Agent, or Firm—Eric B. Meyertons; Conley, Rose & Tayon, P.C.

(57) ABSTRACT

Data communication between a processing unit and external means may take place via a plurality of data streams. Means check the mutual consistency of said streams and report and correct abnormalities. This self-synchronization is achieved by inserting separators into the data streams to separate the data, and by means of a freezing mechanism for freezing the internal operation of the processing unit.

53 Claims, 6 Drawing Sheets

METHOD AND DEVICE PROVIDING TIME SYNCHRONIZATION BETWEEN A PROCESSING UNIT AND EXTERNAL MEANS

BACKGROUND OF THE INVENTION

1. Field of the Invention

Generally, the invention relates to the monitoring of the time synchronization between a processing unit, such as a processor core, with exterior processing means, for example other microprocessors or other systems, during an exchange of data between this processing unit and these exterior processing means, by way in particular of memories of the "first-in first-out" type (FIFO memory).

The invention relates in particular to the exchanging of data at high bit rate between processing units.

2. Description of the Related Art

At present, the synchronizing of the exchanging of data between two hardware systems can be carried out with the aid of a master/slave procedure in which one of the two hardware systems, termed the "master", drives the second, termed the "slave". However, such a mechanism is slow since it requires interchanges of synchronization cues ("handshake"). Furthermore, when such a procedure uses a DMA-based technique, well known to the person skilled in the art ("direct memory access"), the DMA is in charge of the exchange. It is therefore the guarantor that the correct data will arrive at the correct moment. It relies on an addressed organization of the data to be accessed (each datum being associated with an address). However, such a solution only operates well in simple situations (transfer between a memory and a processing core for example) and an asymmetry is created since it is necessary for the exchange to take place between a master and a slave, thus rendering communication impossible without the intermediary of two DMAs.

Furthermore, the DMA requires time to possibly take into account the alterations in its environment (data unavailable, data originating from several sources, etc.) which crops the passband.

It is also possible to use supervised links in which there is still symmetry between the two systems exchanging the data, but the synchronization between these two systems is taken on board by a supervision unit. Such systems are also slower, adapt less easily to the local context of the two systems exchanging the data. Moreover, the supervisor may become complex in cases where several communication paths exist between several systems. Finally, the exchanges are less flexible.

It is further desired that the process and device which will allow massive exchanges of data (wide passband) whose significance does not depend on the precise instant at which they take place and on the time intervals between the data exchanged, but only on the order of the data in the sequence. It is further desired that the process and device allow an exchange of data at high speed between a processing unit and exterior processing means, this having a considerable advantage for real-time systems.

SUMMARY OF THE INVENTION

In an embodiment, the data exchanges may take place through several data streams, means being provided to check the consistency between these streams, signal the anomalies and correct them in most cases or even in all cases.

The self-synchronization preferably allows the processing unit talking to the exterior processing means to work in tempo with the data to be processed and to adapt itself to this tempo. This significant advantage is obtained in particular by the fact that separators are exchanged which travel in the same direction as the data (and make it possible to "tag" the data flow) and are processed "on the fly", as opposed to conventional systems for which there is always two-stage working.

More precisely, in these conventional systems, there is either an interchange of cues in the form of a data send followed by a return of an acknowledgement of receipt, this inevitably taking more time, or, prior to the exchange proper, initialization of a particular mode indicating the nature of the exchange which is going to take place. This can consume an ever larger share of the time the smaller the size of the data or should they arrive irregularly.

Contrary to these conventional methods, an embodiment of the process makes it possible to exchange the data "on the fly" and it moreover makes it possible to correct anomalies in the sequence of data and of separators without slowing the whole system down.

In an embodiment, each data stream possesses its own clock outside or may be asynchronous. In all cases, external access to a data stream is completely uncorrelated temporally from the clock of the processing unit. Thus, an "outgoing" data stream may feed the input of the processing unit directly or constitute an incoming stream for another circuit.

Firstly a process for monitoring the time synchronization between a processing unit and an exterior processing means, the said processing unit being clocked by an internal clock signal and the exterior means delivering, by way of at least one input communication means, at least one clocked incoming stream of incoming cues, to at least one input port connected to the said unit, is described in which incoming cues of data temporally separated by incoming cues for so-called separation (separators), according to a predetermined scheme for incoming separation, are incorporated into the incoming stream, the processing unit is controlled by a first control mechanism which formulates for the said unit, at each cycle of the internal clock, at least one read request cue representative on the one hand of the absence or of the presence of an actual request for reading an incoming cue and on the other hand of the nature of the incoming cue possibly requested by the said unit having regard to the predetermined scheme for incoming separation. Stated otherwise, the read request cue specifies whether the processing unit is actually requesting the reading of an incoming cue or else is not requesting anything at all. The read request cue also specifies the nature of the cue possibly requested by the unit, that is to say a datum or a separator.

The read-available contents of the input port are analyzed, in the presence of an actual request for reading an incoming cue. For example in the case where the input port (for example a FIFO) is empty, and in the event of an absence of a read-available incoming cue, or in the presence of a read-available incoming cue of a different nature from that defined by the said actual read request (the FIFO delivers a datum while the processing unit is requesting a separator and vice versa), a synchronization anomaly cue is formulated.

This synchronization anomaly cue can be a specific cue or a logic signal prompting disabling of the internal operation of the processing unit. In most cases, the synchronization anomaly will be able to be self-corrected. This being so in certain very particular cases, for example when several types of separators exist and no hierarchization has been provided for between these various types of separator, time self-synchronization is not possible and it is then performed under the control of an exterior supervisor.

When the external means deliver respectively to a plurality of input ports by way of a plurality of digital buses, a plurality of clocked incoming streams, incoming cues of data temporally separated by incoming cues for separation, according to respective predetermined schemes for incoming separation, are incorporated into each incoming stream. The first control mechanism then formulates a plurality of read request cues, each being representative for a corresponding incoming stream, on the one hand of the absence or of the presence of an actual request for reading an incoming cue of the said corresponding incoming stream, and, on the other hand of the nature of the incoming cue possibly requested by the said unit having regard to the corresponding predetermined scheme for incoming separation. The available contents of each relevant input port are analyzed, in the presence of at least one actual request for reading an incoming cue of one at least of the incoming streams. In the event of an absence of available incoming cue in one at least of the said relevant input ports, or in the presence of an available incoming cue of a different nature from that defined by the said corresponding actual read request, the said synchronization anomaly cue is formulated.

The incoming separation cues may include separators of different types. The said synchronization anomaly cue is formulated in the presence of an incoming separation cue available in each relevant input port but having a type other than that defined in the corresponding request cue.

This being so, provision may be made to hierarchize the separators according to a predetermined hierarchy. Separators are then incorporated into each stream of incoming cues according to the said hierarchy. As regards the formulating of said synchronization anomaly cue, a separator of a first type is analyzed with respect to a separator of a second type of higher rank than the first type in the hierarchy, in a manner analogous to the analysis of a datum cue with respect to a separation cue of any type, and vice versa.

In a general way, in the presence of an available incoming datum cue in one of the input ports, and which is associated with a request for an incoming separation cue, a signal prompting disabling of the internal operation of the processing unit is generated.

Conversely, in the presence of an available incoming separation cue in one of the input ports, and which is associated with a request for an incoming datum cue, reading from the input port is advantageously disabled while refraining from generating a signal prompting disabling of the internal operation of the processing unit.

The said signal prompting disabling of the internal operation of the processing unit is also advantageously generated in the absence of a read-available incoming cue in one of the input ports having formed the subject of a read request.

In order to correct a synchronization anomaly, the internal operation of the processing unit is advantageously disabled in the presence of at least one signal controlling disabling of the internal operation of this processing unit, and reading is disabled in all the input ports with the exception of those exhibiting a read-available datum cue associated with a request for reading a separation cue.

An embodiment also provides for the monitoring of the time synchronization between a processing unit and exterior processing means intended for processing data or separators delivered by the processing unit. More precisely, the processing unit being clocked by an internal clock signal, it is able to write, in tempo with the internal clock signal, at least one outgoing stream of outgoing cues intended to be processed, according to an output rate, by the said exterior means connected by at least one output communication means to at least one output port, such as a FIFO memory, linked to the processing unit.

The said processing unit is controlled by a second control mechanism which formulates for the said unit, at each cycle of the internal clock, at least one write request cue representative of the absence or of the presence of an actual request for writing an outgoing cue. Stated otherwise, the write request cue makes it possible to determine whether the processing unit is or is not actually prompting to write something to the output port. This outgoing cue intended to be written to the output port can, according to a predetermined scheme for outgoing separation, be an outgoing datum cue (datum properly speaking) or an outgoing separation cue (separator). The read-available contents of the output port are analyzed, in the presence of an actual request for writing an outgoing cue, and in the event of a write unavailability in the output port, a synchronization anomaly cue is formulated.

When several output ports are connected to the processing unit, the second control mechanism formulates a plurality of write request cues, each being representative for each corresponding outgoing stream, of the absence or of the presence of an actual request for writing an outgoing cue in the corresponding outgoing stream, this outgoing cue possibly being, according to a respective predetermined scheme for outgoing separation, an outgoing datum cue or an outgoing separation cue. The read-available contents of each relevant output port are analyzed, in the presence of at least one actual request for writing an outgoing cue, and in the event of write unavailability in one at least of the relevant output ports, the said synchronization anomaly cue is formulated.

The outgoing separation cues may include separators of different types. When the separators of different type are hierarchized according to a predetermined hierarchy, the separators are then incorporated into each stream of outgoing cues according to the said hierarchy.

In the presence of an unavailability of one of the output ports having formed the subject of a write request, a signal prompting disabling of the internal operation of the processing unit is advantageously generated. This signal prompting disabling can then constitute the anomaly cue.

To correct this synchronization anomaly, the internal operation of the processing unit can be disabled in the presence of at least one signal prompting disabling of the internal operation of the processing unit, and writing to all the output ports is disabled.

Of course, when there is provision both for input ports and output ports, the process makes provision for the combination of the characteristics defined hereinabove in conjunction with the input ports, and those defined hereinabove in conjunction with the output ports.

In hardware terms, a device for monitoring the time synchronization between a processing unit and exterior processing means, includes at least one input port connected between the processing unit and the exterior means and intended to receive from the exterior means a clocked incoming stream of incoming cues, comprising incoming cues of data temporally separated by incoming cues for so-called separation, according to a predetermined scheme for incoming separation, first control means formulating at each cycle of the said internal clock, a read request cue representative for the input port, on the one hand of the absence or of the presence of an actual request for reading an incoming cue in the input port and, on the other hand of the nature of the incoming cue possibly requested by the said unit having regard to the scheme for incoming separation, first analysis means for delivering a first analysis cue, representative of the read-available contents of the input port (for example FIFO emply or datum or separator present at FIFO output), first synchronism monitoring means, linked to the first analysis means and to the input port, and possessing at least one main state in which they are able to formulate a synchronization anomaly cue, in the presence of at least one actual request for reading an incoming cue in the input port, and which is associated with an absence of an available incoming cue in this input port, or in the presence of an available incoming cue of a different nature from that defined by the said corresponding actual read request.

When there is provision for several input ports connected between the processing unit and the exterior means and intended respectively to receive, from the exterior means, clocked incoming streams of incoming cues the first control means are able to formulate at each cycle of the said internal clock, a plurality of read request cues, each being representative for a corresponding input port, on the one hand of the absence or of the presence of an actual request for reading an incoming cue in the corresponding input port and, on the other hand of the nature of the incoming cue possibly requested by the said unit having regard to the corresponding predetermined scheme for incoming separation. The first analysis means are able to deliver a first analysis cue representative of the read-available contents of each input port. The first synchronism monitoring means are able, in their main state to formulate a synchronization anomaly cue, in the presence of at least one actual request for reading an incoming cue in one at least of the input ports, and which is associated with an absence of an available incoming cue in this input port, or in the presence of an available incoming cue of a different nature from that defined in the said corresponding actual read request.

According to one embodiment, the first synchronism monitoring means includes, for each input port, first elementary means of detecting modes able to receive the first analysis cue and a read request cue, and to deliver a mode cue as a function of the contents of this first analysis cue and of the read request cue first elementary formulating means possessing at least the said main state in which they are able to formulate the said synchronization anomaly cue at least from the contents of the mode cue are also provided.

The elementary formulating means are advantageously able, in the said main state, to generate a first logic signal representative of a prompt or otherwise for disabling the internal operation of the processing unit as a function of the contents of the mode cue, and a second logic signal representative of a prompt or otherwise for disabling reading in the relevant input port also as a function of the contents of the mode cue. The synchronism monitoring means then includes generating means, linked between the output of the elementary formulating means and an input terminal for disabling the processing unit, which are able to generate a logic signal for disabling the internal operation of the processing unit from the set of first logic signals.

When the frequency of the internal clock exceeds a certain value, the time for conveying the various signals inside the various components of the device can be greater than the duration of an internal clock cycle. In this case, there is advantageously provision to use, for the device, the following embodiment in which for each input port, the device includes p being greater than or equal to one:
p levels of pipeline registers connected between the output of the elementary formulating means and the input terminal for disabling the processing unit,
p latchable cascaded registers for storing request cues, connected between the output of the first control means and the input of the elementary mode detection means by way of a first multiplexer with p+1 inputs,
p latchable cascaded registers for storing incoming cues, connected between the output of the input port and the processing unit by way of a second multiplexer with p+1 inputs.

The elementary formulating means thus furthermore possess p families of auxiliary states, the main state and the families of auxiliary states being indexed and ordered. The elementary formulating means includes a state register able to deliver an index signal identifying the current state of the elementary formulating means. The first and second multiplexers are controlled by the index signal.

The elementary formulating means generate in the main state and in each auxiliary state family, from the mode cue, from the logic signal for disabling the internal operation of the processing unit, and from the index signal, the first logic signal representative of a prompt or otherwise for disabling the internal operation of the processing unit, the second logic signal representative of a prompt or otherwise for disabling reading in the relevant input port, a third logic signal making it possible to latch or otherwise the p registers for storing request cues, a fourth logic signal making it possible to latch or otherwise the p registers for storing incoming cues, and a new value of the states register.

According to one embodiment, in the said main state of the elementary formulating means, and in the absence of the logic signal for disabling the internal operation of the processing unit, the third and fourth logic signals are inactive. Stated otherwise, if the processing unit is not disabled (or "frozen") the p registers for storing request cues and the p registers for storing incoming cues are not frozen.

Conversely, in the said main state of the elementary formulating means, and in the presence of the logic signal for disabling the internal operation of the processing unit, the third and fourth logic signals are active, whilst the first logic signal and the second logic signal are active or inactive as a function of the mode cue. Stated otherwise, in this main state, if the processing unit is frozen, the same holds for the p request storage registers and for the p registers for storing incoming cues (data or separators). Conversely, the freezing of the processing unit is or is not prompted and the reading to the FIFO is or is not disabled as a function of the mode determined by the mode detection means.

In fact, while the first logic signal is inactive, that is to say while there is no prompt for disabling the internal operation of the processing unit, or while the logic signal for disabling the processing unit is active, the synchronism monitoring means remain in their main state implementing the process described above.

On the other hand, when the elementary formulating means are in their main state, they confer on the state register the value of the first index of the family of auxiliary states in the presence of a first active logic signal and in the presence of an inactive disabling logic signal. Stated otherwise, the elementary formulating means pass from their main state to one of the states of the first auxiliary state family in the absence of a freezing of the processing unit but in the presence of an actual signal prompting freezing of the internal operation of the processing unit. The elementary formulating means are then able to confer successively on the states register the values of the following indices until the index p-k is reached in p clock cycles, k being the number of times that the logic signal for disabling the internal operation of the processing unit will have been active in the course of the p cycles. Then, the elementary formulating means are able to confer successively on the state register the values of the previous indices until the index representative of the main state is reached again.

Stated otherwise, starting from the main state, the elementary formulating means having left this main state in the presence of an anomaly (prompt for disabling the internal operation of the processing unit), "descend in the auxiliary state family" in the order of ranking of these families, it being understood that the elementary formulating means can remain in the same family for several clock cycles, until a family of index p-k is reached in p cycles, before "backtracking" progressively up to the main state.

In an embodiment, a device for the monitoring of the time synchronization between the processing unit and exterior processing means intended to receive cues delivered by the processing unit, comprises at least one output port, such as a FIFO memory, connected between the processing unit and the exterior means and intended to receive from the processing unit and in tempo with the internal clock signal of the processing unit, an outgoing stream of outgoing cues including outgoing cues of data temporally separated by outgoing cues for so-called separation, according to a predetermined scheme for outgoing separation, second control means which formulate, at each cycle of the said internal clock, a write request cue representative for the output port, of the absence or of the presence of an actual request for writing an outgoing cue in the output port, this outgoing cue possibly being, according to the predetermined scheme for outgoing separation, an outgoing datum cue or an outgoing separation cue, second analysis means for delivering a second analysis cue representative of the read-available contents of the output port, second synchronism monitoring means are able to formulate a synchronization anomaly cue in the presence of at least one actual request for writing an outgoing cue in the output port, and which is associated with a write unavailability in this output port.

When the device includes several output ports intended to receive respectively from the processing unit and in tempo with the internal clock signal of this processing unit, outgoing streams of outgoing cues, including outgoing cues of data temporally separated by outgoing cues for so-called separation, according to respective predetermined schemes for outgoing separation, the second control means formulate, at each cycle of said internal clock, a plurality of write request cues, each representative for each corresponding output port, of the absence or of the presence of an actual request for writing an outgoing cue in the corresponding output port, this outgoing cue possibly being, according to the respective predetermined scheme for outgoing separation, an outgoing datum cue or an outgoing separation cue. The second analysis means deliver a second analysis cue representative of the read-available contents of each output port and the second synchronism monitoring means are able to formulate a synchronization anomaly cue in the presence of at least one actual request for writing an outgoing cue in an output port, and which is associated with a write unavailability in this relevant output port.

According to one embodiment of the device, the second monitoring means are able, for each output port, in response to a write request cue relating to the corresponding output port, and in the presence of a contents cue representative of the write-available contents of the output port, to generate a fifth logic signal representative of a prompt or otherwise for disabling the internal operation of the processing unit.

More precisely, this fifth logic signal will be representative of an actual prompt for disabling the internal operation of the processing unit in the event of the write unavailability of the output port, that is to say in the event that the output port is "full".

In a general manner, the second analysis means deliver a cue representative of the availability or otherwise in write mode of an output port by comparing the fill level with a chosen threshold. The embodiment can differ depending on whether the output port, for example a FIFO memory, is a register-type FIFO memory or else a FIFO memory of the dual asynchronous port random access type. In the first case, the contents of a particular register will be examined to determine whether the memory is empty or full whilst in the other case the difference of addresses will be taken to determine the fill level.

In the case of a device operating at fast frequency, the principle remains the same but the threshold is chosen differently. Thus, a FIFO will be deemed to be full when the fill level reaches a predetermined level below the maximum fill level.

The second monitoring means are advantageously able in the presence of at least one signal prompting disabling of the internal operation of the processing unit, to disable the internal operation of the processing unit, and to disable writing in all the output ports.

Of course, in the case of time synchronization between the processing unit and exterior means in input and output mode, a monitoring device including the combination of the characteristics defined above in respect of the input monitoring device and of the characteristics defined above in respect of the output monitoring device may be produced.

BRIEF DESCRIPTION OF THE DRAWINGS

Other advantages and characteristics of the invention will emerge on examining an embodiment and a mode of implementation, which is in no way limited, illustrated in the appended drawings in which.

DETAILED DESCRIPTION OF THE INVENTION

Figure 1:
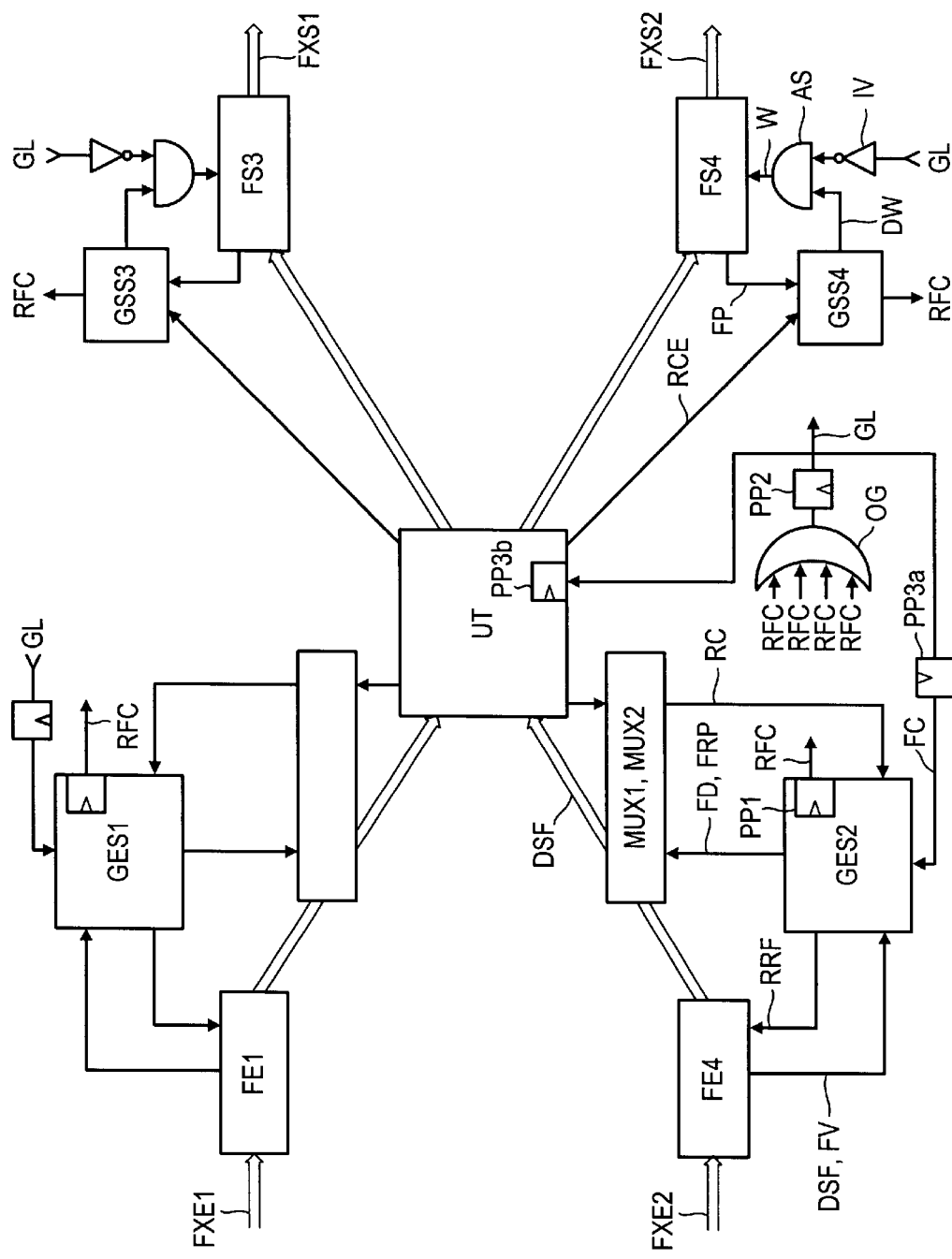
FIG. 1 is a schematic overview of an embodiment of the device capable of operating at high frequency.
Figure 2:
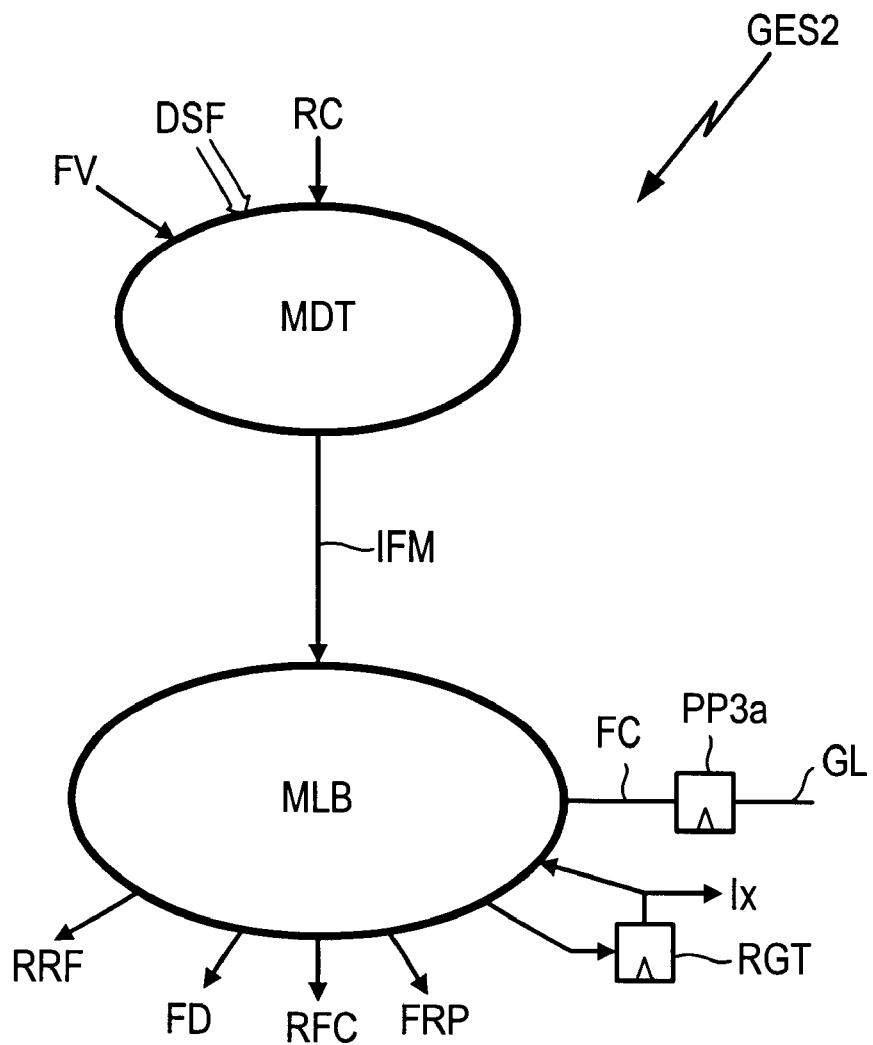
FIGS. 2, 3 and 4 are more detailed schematic representations of parts of the device of FIG. 1.

In a general manner, an embodiment provides for exchanges of logic signals between the various components of the device, these exchanges having to be performed within a duration which is less than that of a cycle of the internal clock of the processing unit UT (FIG. 1). However, having regard to the size of the circuit and to the technology used to construct the integrated circuit, this duration constraint may be incompatible with a high frequency of the internal clock of the processing unit. This is the case in particular when the device which will now be described operates with a clock frequency of greater than about 30 MHz with CMOS 0.5 µ technology.

For such a configuration, provision is then advantageously made to use the device described in FIGS. 1 to 6 which provides in particular for the use of pipeline registers as well as of other registers or flip-flops and which is capable of being latched or frozen on command.

However, for an internal clock frequency of below 30 MHz, in the case of 0.5 µ technology, the structure of the device which will now be described may be simplified as will be explained in greater detail below.

Of course, in each situation, and having regard to the technology employed, the person skilled in the art will be able to determine whether the size of the circuit and the frequency of the internal clock does or does not require the use of an embodiment capable of operating at "fast frequency".

As illustrated in FIG. 1, a processing unit UT for example a microprocessor core is linked to exterior processing means (not represented here for the sake of simplification) by way of input ports FE1, FE2 and of output ports FS3, FS4. These input and/or output ports can for example be register-type FIFO memories, or else be of the dual asynchronous port random access memory type such as those described for example in French patent application No. 94 12170.

For the sake of simplification, FIG. 1 represents two input ports and two output ports allowing the processing unit to receive cue streams from two exterior processing means and to deliver streams of cues to two exterior processing means. This being so, the number of these input and output ports can be reduced to 1 or else be greater than 2.

Exterior means therefore deliver an incoming stream FXE1 of incoming cues to the memory FE1. Other exterior means deliver an incoming stream FXE2 of incoming cues to the memory FE2. Exterior means may moreover extract from the output memory FS3 an outgoing stream of outgoing cues FXS1 delivered by the processing unit UT whilst other exterior means may extract from the output memory FX4 another outgoing stream FXS2 of outgoing cues. All these streams of cues are clocked at clock frequencies which may be equal or different from one another, and different from the frequency of the internal clock of the processing unit.

Each incoming stream includes incoming cues of data, or data proper, which are separated by incoming cues for so-called separation or "separators". The general scheme for the separation of the data by the separators is predetermined and known to the processing unit for each input port. Moreover, each outgoing stream also includes data temporally separated by separators according to a predetermined scheme for outgoing separation.

A separator is a particular datum which is distinguished from the data proper by virtue of a predetermined bit of the digital word constituting the cue. For example, if this bit equals "1" the cue is regarded as a separator whilst if "0" this cue is regarded as being a datum.

Several types of different separators may be envisaged. Each type of separator is designated either by its coding (the bits of the digital word) or by its numeral. In the latter case, the correspondence between the coding and the numeral can be effected in a diverse manner. Thus, the simplest case is that the coding is the binary representation of the numeral. It is also possible to establish a correspondence table contained in a memory of the processing unit making it possible to establish a correspondence between a particular coding and the numeral of a separator.

When several types of separator can be incorporated into the incoming or outgoing streams, it is preferable for these various types to be hierarchized.

Synchronism monitoring means referenced GES1, GES2, GSS3 and GSS4, are connected between the respective input and output ports and the processing unit.

In a general manner, the checking of synchronization is performed in these synchronism monitoring means. It consists in particular in checking that the incoming stream does indeed conform with what the processing unit expects, having regard to the separation scheme associated with this incident stream.

Thus, if an input port is empty, it is presumed that synchronization is complied with until the memory receives a datum or a separator.

If the processing unit does not issue any request for reading from this input port, synchronization is complied with.

Likewise, if the processing unit issues a request for reading a datum and if the first digital word which should exit the relevant input port is a datum, synchronization is complied with.

If the processing unit issues a request for reading a separator and if the first digital word which should exit the relevant input port is this separator (that is to say of the type designated in the request) synchronization is complied with.

On the other hand, if the processing unit issues a request for reading a separator and if the first word which should exit the input memory is another separator, that is to say a separator of another type, or else a datum, synchronization is no longer complied with.

If the processing unit issues a request for reading a datum but the first word which should exit the relevant input memory is a separator, synchronization is likewise no longer complied with.

When synchronization is no longer complied with, it is possible at the very least to issue a synchronization anomaly cue. In certain cases, especially when no hierarchy is provided for between the separators of different types, it will not be possible for the device itself to correct this synchronization anomaly but it will perhaps be possible for an exterior supervisor to do so. In the other cases, the device makes it possible automatically to resynchronize the processing unit with respect to an incoming stream. This is the case in particular when provision is made for a hierarchy of the separators. This is because, in this case, the separators being incorporated in each incoming stream according to the said hierarchy, a separator of a first type will be analyzed with respect to a separator of a second type of higher rank than the first type in the said hierarchy, in a manner analogous to the analysis of a datum with respect to a separator of any type, and vice versa.

In an embodiment the device also makes it possible to detect whether the incoming streams are desynchronized with respect to one another. This is because, if such is the case, they will in general be so also in relation to the processing unit.

As regards the outgoing streams, the detection of a synchronization anomaly is much simpler. It consists simply in checking whether the output port in which the processing unit wishes to write a datum or a separator is write-available or else write-unavailable, that it so say "full".

The structure of the means of the device connected between the input port FE2 and the processing unit will now be described in greater detail, given that identical means are connected between each input port and the processing unit.

Functionally, the block GES2 includes first elementary means of mode detection MDT (FIG. 2) and first elementary formulating means MLB linked to the detection means MDT. These means can be embodied in software form or else in the form of an application-specific integrated circuit (ASIC). Provision is also made for a state register RGT linked to the means MLB and the functional capability of which will be returned to in greater detail below.

The processing unit UT; includes control means able to deliver at each cycle of the internal clock a request cue RC representative of a prompt or otherwise for reading from the input port FE2 and of the nature of the cue requested having regard to the corresponding scheme for incoming separation. Stated otherwise, the request cue RC makes it possible to determine whether the processing unit is actually requesting the reading of a cue from the input port or is not requesting anything at all. Furthermore, in the case in which the processing unit is actually requesting a cue, the request cue RC makes it possible to determine whether this requested cue is a datum or a separator and possibly which type of separator it is. These control means are in fact embodied in a software manner in the processing unit and are incorporated for example into the program memory associated with the microprocessor.

The device furthermore includes p levels of pipeline registers (p=3 in the present case) PP1, PP2, PP3a; PP3b, connected between the output of the elementary formulating means and an input terminal of the processing unit referred to here as the "disabling input terminal" since it will in fact receive a logic signal GL representative of a disabling or otherwise of the internal operation of the processing unit.

More precisely, when this logic signal GL is active, that is to say when it takes for example the value 1, the internal operation of the processing unit will be disabled or latched. Conversely, this will not be the case when this logic signal GL is inactive, that is to say when it takes for example the value 0. Provision could for example be made for this signal GL to completely interrupt the operation of the processing unit. This being so, it is possible to obtain the disabling of the internal operation of the processing unit as well as the latching or freezing of any register on the basis of the embodiment provided for in FIG. 6. Represented in this FIG. 6 in a general manner is a flip-flop BSC whose output is looped back to the datum input by way of a duplexer DDX controlled by a freeze logic signal referenced GEL. When this logic signal is inactive, that is to say when it equals 0, the flip-flop BSC accepts a new datum. On the other hand, when the freeze signal is actually active, the output of the flip-flop BSC is looped back to its input. Consequently, the datum present in this flip-flop is latched and there are no longer any alterations in the cues delivered by these flip-flops.

Figure 3:
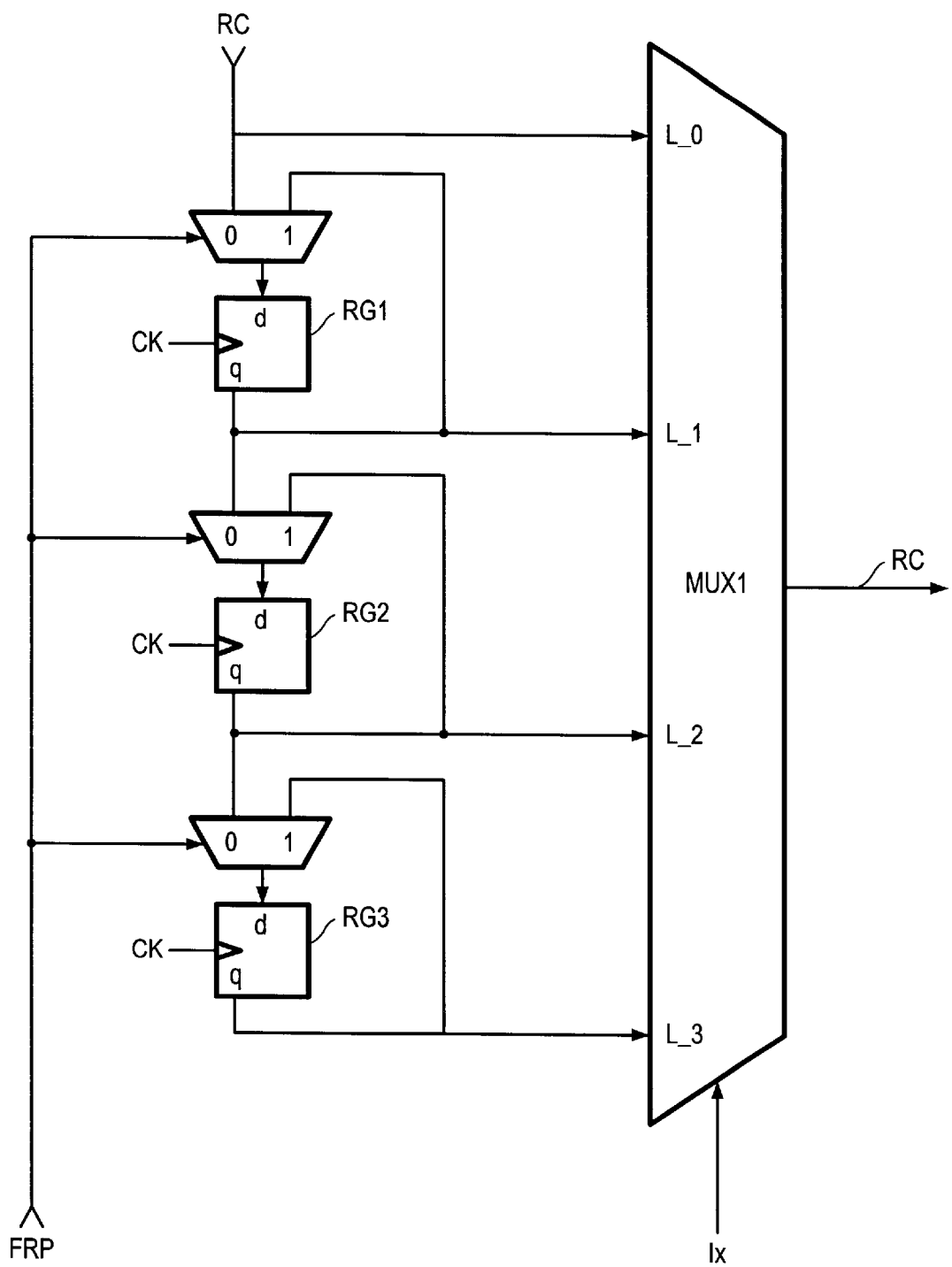

If reference is made more particularly to FIG. 3, it may be seen that the first control means of the processing unit are linked to the elementary formulating means and more particularly to the mode detection means MDT by way of a first multiplexer MUX1 with p+1 input and one output. This multiplexer MUX1 is controlled by an index signal Ix which is in fact representative of the contents of the state register RGT.

Provision is made for p latchable cascaded registers for request cue storage, these registers being referenced RG1, RG2, RG3 (p=3) in the example described. The duplexers associated with these three latchable registers and which make it possible actually to latch them or otherwise, are controlled by a logic signal FRP. If this logic signal FRP is inactive, that is to say if it equals zero for example, the registers are not frozen whilst if this logic signal is active, that is to say if it equals 1, the registers are latched.

Figure 4:
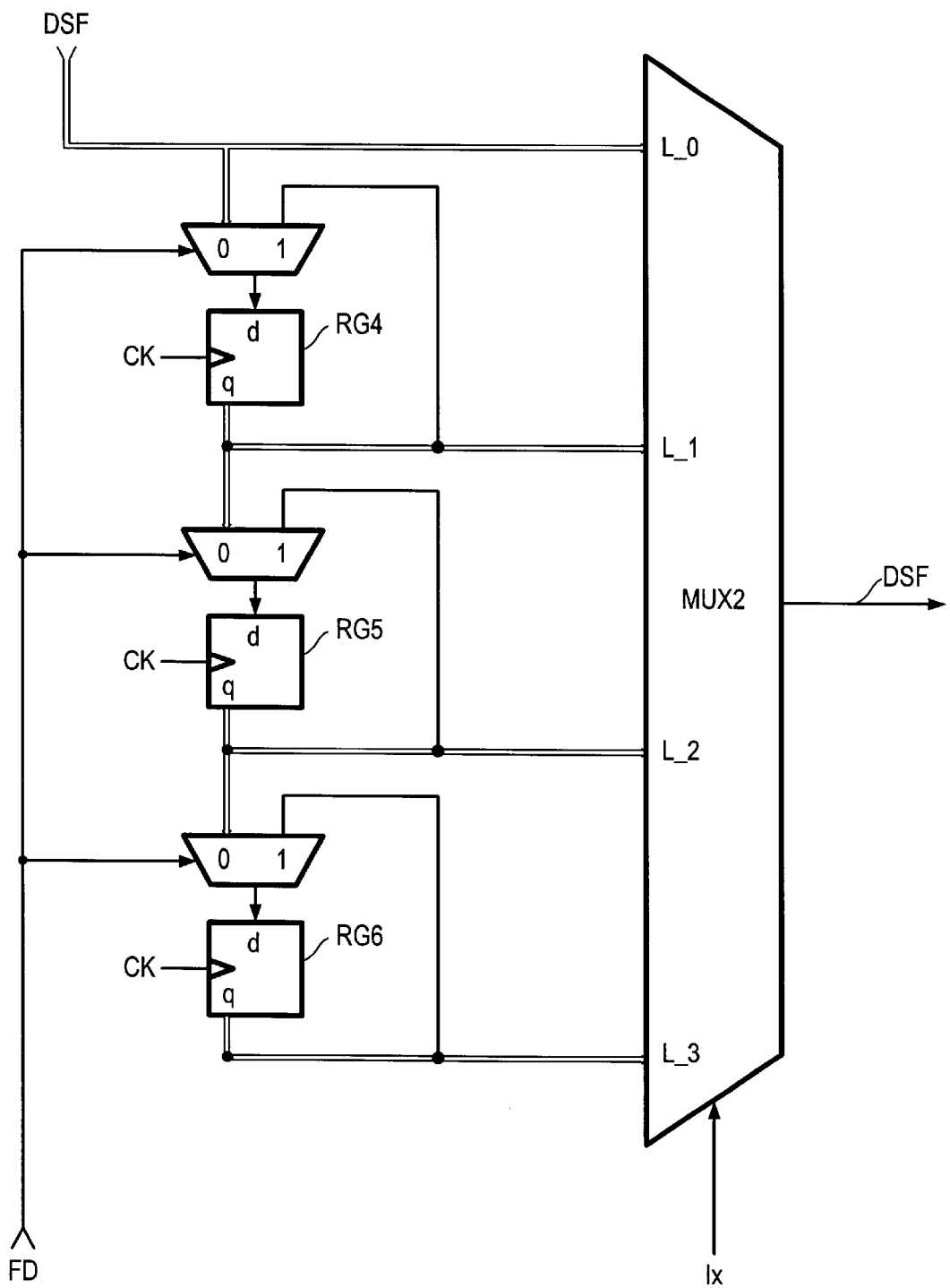

In an analogous manner as may be seen more particularly in FIG. 4, the cues DSF available at the output of the input port FE2 are delivered to the processing unit UT by way of a second multiplexer MUX2 having a structure analogous to that of the multiplexer MUX1 and likewise controlled by the index signal Ix. In this regard, whereas the data are always transmitted to the processing unit, provision may be made to transmit or not transmit the separators to the processing unit. Provision is also made for p latchable cascaded registers for storing incoming cues, respectively referenced RG4, RG5 and RG6. These registers may be latched from the logic signal FD according to the value 0 or 1, of this logic signal, doing so in a manner analogous to that described in respect of the logic signal FRP.

First analysis means are also provided for delivering an analysis cue representative of the read-available contents of the input port. This first analysis cue in fact includes the signal DSF as well as a logic signal FV indicating whether the input port is empty or not. These first analysis means may be integrated into the input port or else be provided for in the block GES2. The person skilled in the art is aware of the way to construct such analysis means in the conventional manner. Thus, in the case of a register-type FIFO, this cue FV is obtained from the position of a cursor in the memory. When an FIFO is constructed from a dual-port static RAM memory and from two incrementers supplying a write address and a read address, the fill level, that is to say the logic signal FV will be evaluated by taking the difference of these two incrementers.

The mode detection means MDT therefore receive the signals FV, DSF and RC and formulate a mode cue IFM as a function of the value of these signals.

More particularly, in the example described here which provides for a hierarchy of the separators, the cue IFM makes it possible to distinguish five modes respectively referenced STAN, NOTH, GO, REMO, INSE.

More precisely, when the request cue RC is representative of an absence of a read request, the NOTH mode prevails.

When the FIFO is empty, the STAN mode prevails.

When the cue RC is representative of a request for a datum and when the cue DSF is representative of an actually available datum, the GO mode prevails.

This is also the case when a separator of a certain type is requested and when this separator [lacuna] actually read-available at the output of the FIFO.

When a separator is requested and a datum is present at the output of the FIFO, then the REMO mode prevails. The same holds when a separator of higher rank is requested by the processing unit whereas a separator of lower rank is available at the output of the FIFO.

Finally, when a datum is requested but a separator is available at the output of the FIFO, the INSE mode prevails. The same holds when a separator of lower rank is requested by the processing unit whereas a separator of higher rank is available at the output of the FIFO.

Figure 5:
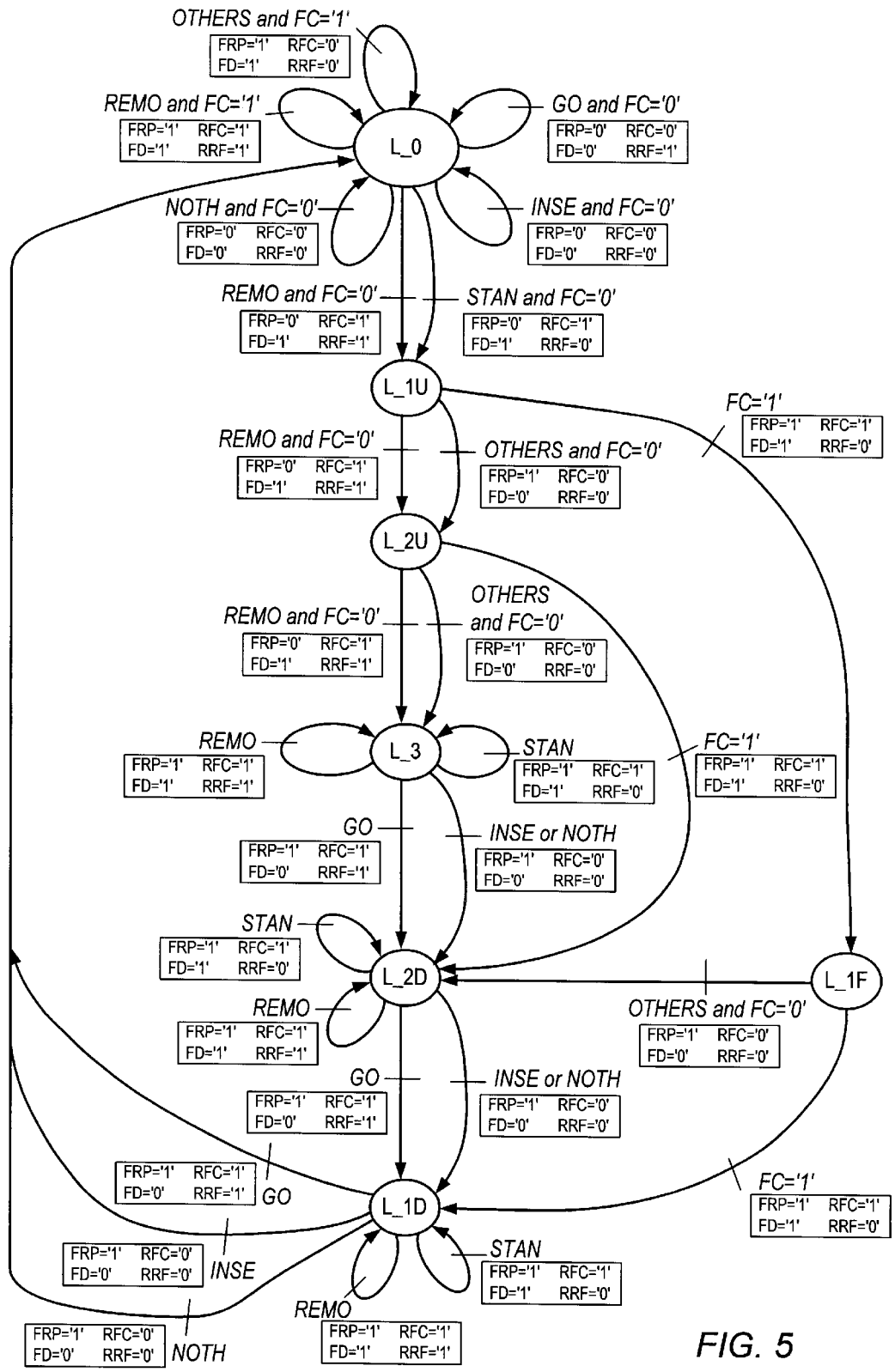
FIG. 5 illustrates a state automaton corresponding to one mode of implementation of the process and, FIG. 6 illustrates schematically the mechanism for disabling or freezing a flip-flop.
Figure 6:
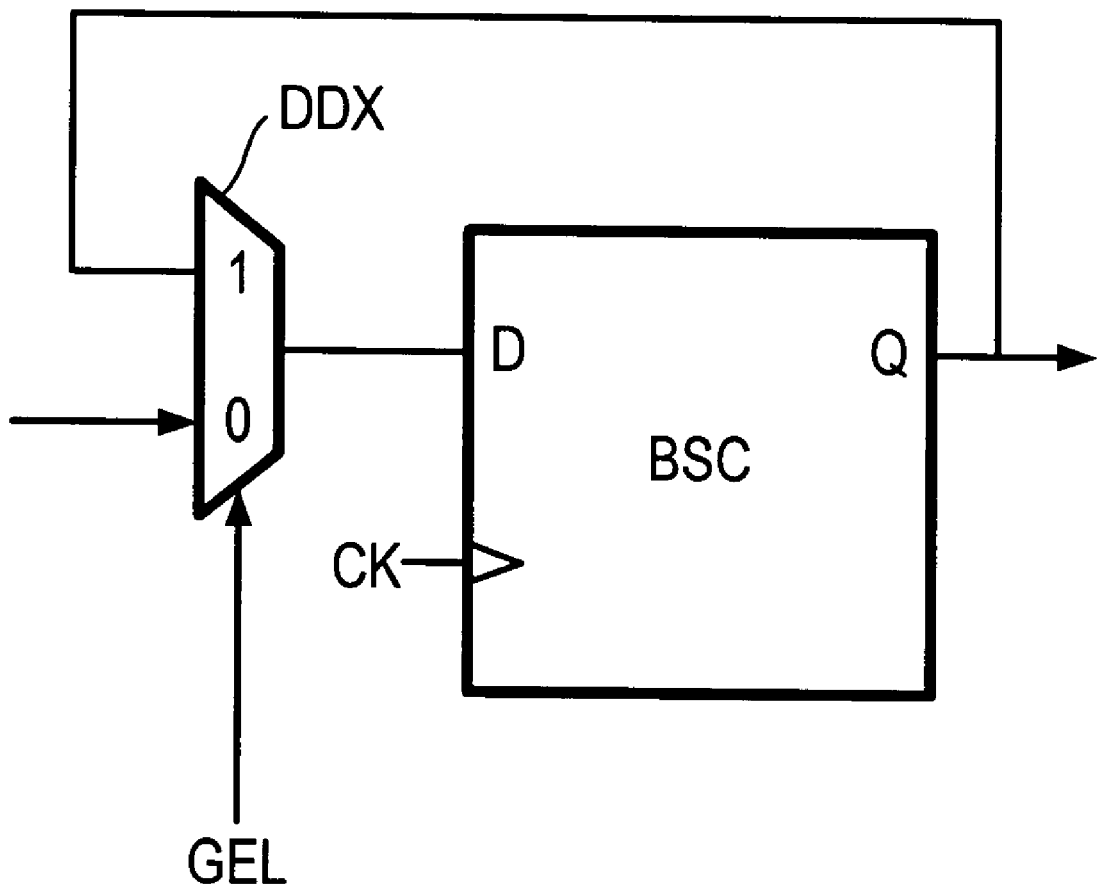

As may be seen more particularly in FIG. 5, the elementary formulating means MLB possess a main state L0 and three auxiliary state families (p=3). The first auxiliary state family includes these three states referenced L1U, L1F and L1D whilst the second auxiliary state family includes two states referenced L2U and L2D and the third auxiliary state family here includes just a single state referenced L3.

The auxiliary state families are indexed and ordered. The index signal of the state register identifies the current state of the elementary formulating means. Stated otherwise, when the index signal Ix equals 0, the elementary means are in the main state L0 whilst when it equals 1 the elementary means are in the first state family L1 and so on.

The logic signal GL for disabling the operation of the processing unit UT is obtained, after delay in the pipeline PP2, at the output of a logic or gate referenced OG, receiving as input, logic signals RFC for prompting disabling of the internal operation of the processing unit, these signals RFC originating from all the blocks GES1, GES2, GES3 and GES4. Stated otherwise, the signal GL will be active as soon as one of the signals RFC is active whereas it will be inactive when all the signals RFC are inactive.

The elementary formulating means MLB generate, in the main state L0 and in each auxiliary state family, from the mode cue IFM, from the logic signal FC (signal GL delayed) for disabling the internal operation of the processing unit, and from the index signal Ix, the logic signal RFC representative of a prompt or otherwise for disabling the internal operation of the processing unit, a second logic signal RRF representative of a prompt or otherwise for disabling reading from the relevant input port. Stated otherwise, if the signal RRF is active, that is to say if it is at 1 for example, there will actually be reading from the FIFO whereas if it is inactive there will be no reading from the FIFO. The means MLB also generate the third logic signal FRP making it possible to latch or otherwise the p registers for storing request cues, the fourth logic signal FD making it possible to latch or otherwise the p registers for storing incoming cues, as well as a new value Ix of the state register RGT.

In fact, the logic signal RFC can be used as signal signifying, when it is at 1, that a synchronization anomaly is present.

The representation of FIG. 5 is a conventional representation of a state automaton. The elementary formulating means leave a current state via one of the routes provided for on departure from this current state when the provisions provided for with regard to the feature barring this route are realized. In this case, the various logic signals take the values indicated in the corresponding rectangle. By way of example, the elementary formulating means being in the main state L0, will leave this state L0 and return thereto when the mode cue is equal to INSE and when the logic signal FC is equal to 0. In this case, the signals FRP, FD, RFC and RRF take the values zero.

The expression "OTHERS" signifies all the other remaining modes belonging to the set of five values defined above.

Thus, when the elementary formulating means are in the main state, and in the absence of any disabling of the internal operation of the processing unit, that is to say when the signal FC is inactive (value 0), the signals FRP and FD are inactive. Conversely, in the main state L0 and in the presence of a disabling of the internal operation of the processing unit (FC=1) these signals FRP and FD are active (they equal 1) whilst the signal RFC is inactive (there is no prompt asking for the freezing of the processing unit) unless the REMO mode prevails, and the second logic signal RRF is inactive or active as a function of the mode cue. Stated otherwise, the FIFO is read or is not read as a function of the prevailing mode.

More precisely, in the GO mode, the FIFO memory is read but there is no prompt asking for the freezing of the processing unit (RFC=0).

In the INSE mode, the FIFO is not read and there is no prompt asking for the freezing of the processing unit.

On the other hand, in the REMO mode there is a prompt asking for the freezing of the processing unit but the FIFO is read all the same.

In the STAN mode, there is a prompt asking for the freezing of the processing unit and the FIFO is not read.

This being so, when the signal FC is inactive and the REMO or STAN modes prevail, the elementary formulating means leave the main state in order to take one of the states of the first auxiliary state family. Then, in a general manner, the elementary formulating means will run through the state automaton in descending order of families of auxiliary states, given that they may remain at one and the same level for several clock cycles until a family Fp-b is reached in p cycles, before backtracking progressively up to the main state L0. The synchronization anomaly has then been corrected. k is the number of times that the logic signal GL will have been equal to 1 in the descent phase lasting p cycles.

In a general manner, when the elementary formulating means run through the state family in ascending order of the indices ("going down"), the elementary formulating means stay in a current family Li if the signal GL (or FC) equals 1. In this case, the signals FRP and FD are active whilst the signal RRF is inactive. If on the other hand the signal GL equals 0, the elementary formulating means drop down into the next state family Li+1 and the logic signal FRP equals 0 whilst the signal FD equals 1. For its part, the signal RRF equals 1 if the REMO mode prevails, and 0 otherwise.

When the elementary formulating means run through the indices in descending order, that is to say in the direction of backtracking up towards the main state, the elementary formulating means stay in a current state family Li if the mode cue is equal to STAN or REMO. The logic signal FD then equals 1. In the contrary case, the elementary formulating means backtrack up to family Li-1 and the logic signal FD equals 0.

For further details on the conditions for changing states in this particular mode of implementation, the person skilled in the art will be able to refer to the state automaton of FIG. 5.

In a general manner, the program housed in the control means of the processing unit starts from the principle that it obtains everything which it asks for (reading or writing of data or of separators). If the environment is unfavorable thereto, that is to say if one at least of the input or output ports is not in a position to respond to this expectation, operation of the internal unit will be frozen, that is to say its internal state will be immutable up to the end of the freezing.

This freezing mechanism, in combination with the use of separators makes it possible to divorce the precise time instants of the inputs/outputs, from the precise instant at which these data or separators are actually used by the processing unit. The processing unit is thus freed from the constraint of the precise instant at which the cues arrive. Hence, the program of the processing unit can be written very simply. This eases real-time implementations.

Moreover, the use of the p levels of pipeline registers associated with the other latchable registers as well as with the various auxiliary states, makes it possible to operate the device at a very sizable clock frequency since it makes it possible to obtain a request p internal clock cycles before the moment of [sic] any resulting input cue will actually be available at the input of the processing unit.

Of course, the person skilled in the art will be able to tailor the value of p having regard to the frequency desired for the internal clock and to the size and technology used for the circuit.

This being so, when the chosen clock frequency is compatible with the architecture and the technology of the circuit, the structure of the device may can be simplified.

Thus, in such a case, the pipeline registers as well as the latchable registers for request and incoming cue storage may be omitted. The same holds for the multiplexers MUX1 and MUX2 and for the state register RGT. In fact, the elementary formulating means then possess only a single state which corresponds to the main state just described. They thus formulate the signals RRF and RFC alone from the cue IFM alone.

More precisely, the synchronization anomaly cue is formulated in the absence of a read-available incoming cue in the input port or in the presence of a read-available incoming cue of a different nature from that defined by the actual read request.

The signal RFC (prompt for disabling the internal operation of the processing unit) equals 1 in the presence of a datum available in one of the input ports associated with a request for a separator.

Moreover, in the presence of a separator available in one of the input ports, and which is associated with a request for a datum in this input port, reading from this input port is disabled while refraining from generating a signal prompting disabling of the internal operation of the processing unit (RFC=0).

Of course, the signal RFC is also activated in the presence of an empty FIFO having formed the subject of a read request.

Finally, the internal operation of the processing unit is disabled (GL=1) in the presence of at least one active RFC signal and reading is disabled from all the input ports with the exception of those exhibiting a read-available datum and associated with a request for reading a separator.

The structure of the second synchronism monitoring means (GSS4) connected between the processing unit and each of the output ports (FS4) is much simpler both from the hardware standpoint and the functional standpoint.

More precisely, second analysis means are provided, analogous to the first analysis means, which make it possible to deliver a second analysis cue FP representative of the read-available contents of each output port. In practice, this cue FP will indicate whether the output port, in this instance the FIFO, is full. The second synchronism monitoring means are then able to formulate a synchronization anomaly cue (which may for example be the freeze prompt RFC), in the presence of an actual write request RCE delivered by the second control means of the processing unit, and which is associated with a write unavailability in the output port (output port full). In this case, the signal RFC equals 1 and the signal DW which causes writing to the output port is inactive (it equals 0 for example). Moreover, the second synchronism monitoring means are able, in the presence of at least one signal prompting disabling of the internal operation of the processing unit (RFC=1) to disable the internal operation of the processing unit (GL=1), and to disable writing to all the output ports (signal W=0). In hardware terms, this is achieved simply in a logic manner with the aid of an AND gate referenced AS which receives the signal DW emanating from the block GSS4 on one of its inputs and the signal GL inverted in an inverter IV on the other input.

In the case of operation of the device at high frequency, provision is made simply to shift the threshold for detecting the filling of an output port. Stated otherwise, a signal FP representative of a full output port will be sent when the latter is in fact only partially filled.

Conversely, in the case of operation at low frequency, a signal fp representative of a full output port will be sent when the latter is actually full.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. Process for monitoring the time synchronization between a processing unit and exterior processing means, the said processing unit being clocked by an internal clock signal and the exterior means delivering, by way of at least one input communication means, at least one clocked incoming stream of incoming cues, to at least one input port connected to the said unit, in which incoming cues of data temporally separated by incoming cues for so-called separation, according to a predetermined scheme for incoming separation, are incorporated into the said incoming stream, the said processing unit is controlled by a first control mechanism which formulates for the said unit, at each cycle of the internal clock at least one read request cue representative on the one hand of the absence or of the presence of an actual request for reading an incoming cue and on the other hand of the nature of the incoming cue possibly requested by the said unit having regard to the predetermined scheme for incoming separation, the read-available contents of the input port are analyzed, in the presence of an actual request for reading an incoming cue, and in the event of an absence of a read-available incoming cue or in the presence of a read-available incoming cue of a different nature from that defined by the said actual read request, a synchronization anomaly cue is formulated.

2. Process according to claim 1, in which the external means deliver respectively to a plurality of input ports by way of a plurality of digital buses, a plurality of clocked incoming streams, wherein incoming cues of data temporally separated by incoming cues for separation, according to respective predetermined schemes for incoming separation, are incorporated into each incoming stream, and wherein the first control mechanism formulates a plurality of read request cues, each being representative for a corresponding incoming stream, on the one hand of the absence or of the presence of an actual request for reading an incoming cue of the said corresponding incoming stream, and, on the other hand of the nature of the incoming cue possibly requested by the said unit having regard to the corresponding predetermined scheme for incoming separation, and in that the available contents of each relevant input port are analyzed, in the presence of at least one actual request for reading an incoming cue of one at least of the incoming streams, and in the event of an absence of available incoming cue in at least of the said relevant input ports, or in the presence of an available incoming cue of a different nature from that defined by the said corresponding actual read request, the said synchronization anomaly cue is formulated.

3. Process according to claim 1, wherein the incoming separation cues comprise incoming separation cues of different types, and in that the said synchronization anomaly cue is formulated in the presence of an incoming separation cue available in each relevant input port but having a type other than that defined in the corresponding request cue.

4. Process according to claim 3, wherein the various types of separation cues are hierarchized according to a predetermined hierarchy, in that the separation cues are incorporated into each stream of incoming cues according to the said hierarchy, and in that, as regards the formulating of the said synchronization anomaly cue, a separation cue of a first type is analyzed with respect to a separation cue of a second type of higher rank than the first type in the said hierarchy, in a manner analogous to the analysis of a datum cue with respect to a separation cue of any type, and vice versa.

5. Process according to claim 1, wherein in the presence of an available incoming datum cue in one of the input ports, and which is associated with a request for an incoming separation cue, a signal prompting disabling of the internal operation of the processing unit is generated.

6. Process according to claim 5, wherein in the absence of a read-available incoming cue in one of the input ports having formed the subject of a read request, the said signal prompting disabling of the internal operation of the processing unit is generated.

7. Process according to claim 6, wherein the internal operation of the processing unit is disabled in the presence of at least one signal prompting disabling of the internal operation of the processing unit, and reading is disabled in all the input ports with the exception of those exhibiting a read-available datum cue associated with a request for reading a separation cue.

8. Process according to claim 5, wherein the internal operation of the processing unit is disabled in the presence of at least one signal prompting disabling of the internal operation of the processing unit, and reading is disabled in all the input ports with the exception of those exhibiting a read-available datum cue associated with a request for reading a separation cue.

9. Process according to claim 1, wherein in the presence of an available incoming separation cue in one of the input ports, and which is associated with a request for an incoming datum cue, reading from the input port is disabled while refraining from generating a signal prompting disabling of the internal operation of the processing unit.

10. Process according to claim 9 wherein in the absence of a read-available incoming cue in one of the input ports having formed the subject of a read request, the said signal prompting disabling of the internal operation of the processing unit is generated.

11. Process according to claim 9, wherein the internal operation of the processing unit is disabled in the presence of at least one signal prompting disabling of the internal operation of the processing unit, and reading is disabled in all the input ports with the exception of those exhibiting a read-available datum cue associated with a request for reading a separation cue.

12. Process for monitoring the time synchronization between a processing unit and exterior processing means, the said processing unit being clocked by an internal clock signal and being able to write to at least one output port, in tempo with the internal clock signal, at least one outgoing stream of outgoing cues intended to be processed, according to an output rate, by the said exterior means connected by at least one output communication means to said output port, in which the said processing unit is controlled by a second control mechanism which formulates for the said unit, at each cycle of the internal clock, at least one write request cue representative of the absence or of the presence of an actual request for writing an outgoing cue, this outgoing cue possibly being, according to a predetermined scheme for outgoing separation, an outgoing datum cue or an outgoing separation cue, and in that the read-available contents of the output port are analyzed, in the presence of an actual request for writing an outgoing cue, and in the event of a write unavailability in the output port, a synchronization anomaly cue is formulated.

13. Process according to claim 12, in which the processing unit is able to write to a plurality of output ports connected to the said processing unit, in tempo with the internal clock signal, a plurality of outgoing streams of outgoing cues intended to be processed, according to respective output rates, by the said exterior means connected to the said output ports by a plurality of digital output buses, wherein the second control mechanism formulates a plurality of write request cues, each representative for each corresponding outgoing stream, of the absence or of the presence of an actual request for writing an outgoing cue in the corresponding outgoing stream, this outgoing cue possibly being, according to a respective predetermined scheme for outgoing separation, an outgoing datum cue or an outgoing separation cue, and in that the read-available contents of each relevant output port are analyzed, in the presence of at least one actual request for writing an outgoing cue, and in the event of write unavailability in one at least of the relevant output ports, the said synchronization anomaly cue is formulated.

14. Process according to claim 13, wherein the outgoing separation cues comprise outgoing separation cues of different types.

15. Process according to claim 13, wherein in the presence of an unavailability of one of the output ports having formed the subject of a write request, a signal prompting disabling of the internal operation of the processing unit is generated.

16. Process according to claim 12, wherein the outgoing separation cues comprise outgoing separation cues of different types.

17. Process according to claim 16, wherein the various types of outgoing separation cues are hierarchized according to a predetermined hierarchy, and wherein the outgoing separation cues are incorporated into each stream of outgoing cues according to the said hierarchy.

18. Process according to claim 17, wherein in the presence of an unavailability of one of the output ports having formed the subject of a write request, a signal prompting disabling of the internal operation of the processing unit is generated.

19. Process according to claim 12, wherein in the presence of an unavailability of one of the output ports having formed the subject of a write request, a signal prompting disabling of the internal operation of the processing unit is generated.

20. Process according to claim 19, wherein the internal operation of the processing unit is disabled in the presence of at least one signal prompting disabling of the internal operation of the processing unit, and writing to all the output ports is disabled.

21. Process for monitoring the time synchronization between a processing unit exterior processing means, the said processing unit being clocked by an internal clock signal and the exterior means delivering, by way of at least one input communication means, at least one clocked incoming stream of incoming cues, to at least one input port connected to the said unit, in which incoming cues of data temporally separated by incoming cues for so-called separation, according to a predetermined scheme for incoming separation, are incorporated into the said incoming stream;

the said processing unit is controlled by a first control mechanism which formulates for the said unit, at each cycle of the internal clock at least one read request cue representative on the one hand of the absence or of the presence of an actual request for reading an incoming cue and on the other hand of the nature of the incoming cue possibly requested by the said unit having regard to the predetermined scheme for incoming separation;

the read-available contents of the input port are analyzed, in the presence of an actual request for reading an incoming cue, and in the event of an absence of a read-available incoming cue or in the presence of a read-available incoming cue of a different nature from that defined by the said actual read request, a synchronization anomaly cue is formulated;

and wherein the said processing unit is able to write to at least one output port, in tempo with the internal clock signal, at least one outgoing stream of outgoing cues intended to be processed, according to an output rate, by the said exterior means connected by at least one output communication means to said output port, in which the said processing unit is controlled by a second control mechanism which formulates for the said unit, at each cycle of the internal clock, at least one write request cue representative of the absence or of the presence of an actual request for writing an outgoing cue, this outgoing cue possibly being, according to a predetermined scheme for outgoing separation, an outgoing datum cue or an outgoing separation cue, and in that the read-available contents of the output port are analyzed, in the presence of an actual request for writing an outgoing cue, and in the event of a write unavailability in the output port, a synchronization anomaly cue is formulated.

22. Device according to claim 21, wherein the second monitoring means are able, for each output port, in response to a write request cue relating to the corresponding output port, and in the presence of a contents cue representative of the read-available contents of the output port, to generate a fifth logic signal representative of a prompt or otherwise for disabling the internal operation of the processing unit.

23. Device according to claim 22, wherein the second monitoring means are able in the presence of at least one signal prompting disabling of the internal operation of the processing unit, to disable the internal operation of the processing unit, and to disable writing in all the output ports.

24. Device according to claim 22, wherein the second analysis means deliver a cue representative of the availability or otherwise in write mode of an output port by comparing the fill level with a chosen threshold.

25. Device for monitoring the time synchronization between a processing unit and exterior processing means, comprising at least one input port connected between the processing unit and the exterior means and intended to receive from the exterior means a clocked incoming stream of incoming cues, comprising incoming cues of data temporally separated by incoming cues for so-called separation, according to a predetermined scheme for incoming separation, first control means formulating at each cycle of the said internal clock, a read request cue representative for the input port, on the one hand of the absence or of the presence of an actual request for reading an incoming cue in the input port and, on the other hand of the nature of the incoming cue possibly requested by the said unit having regard to the scheme for incoming separation, first analysis means for delivering a first analysis cue, representative of the read-available contents of the input port, first synchronism monitoring means, linked to the first analysis means and to the input port, and possessing at least one main state in which they are able to formulate a synchronization anomaly cue, in the presence of at least one actual request for reading an incoming cue in the input port, and which is associated with an absence of an available incoming cue in this input port, or in the presence of an available incoming cue of a different nature from that defined by the said corresponding actual read request.

26. Device according to claim 25, further comprising a plurality of input ports connected between the processing unit and the exterior means and intended respectively to receive, from the exterior means, clocked incoming streams of incoming cues, comprising incoming cues of data temporally separated from incoming cues for so-called separation, according to respective predetermined schemes for incoming separation, in that the first control means are able to formulate at each cycle of the said internal clock, a plurality of read request cues, each being representative for a corresponding input port, on the one hand of the absence or of the presence of an actual request for reading an incoming cue in the corresponding input port and, on the other hand of the nature of the incoming cue possibly requested by the said unit having regard to the corresponding predetermined scheme for incoming separation, in that the first analysis means are able to deliver a first analysis cue representative of the read-available contents of each input port, and in that the first synchronism monitoring means are able, in their main state to formulate a synchronization anomaly cue, in the presence of at least one actual request for reading an incoming cue in one at least of the input ports, and which is associated with an absence of an available incoming cue in this input port, or in the presence of an available incoming cue of a different nature from that defined in the said corresponding actual read request.

27. Device according to claim 26, wherein the first synchronism monitoring means comprise, for each input port, first elementary means of detecting modes able to receive the first analysis cue and a read request cue, and to deliver a mode cue as a function of the contents of the first analysis cue and of the read request cue, and first elementary formulating means possessing at least the said main state in which they are able to formulate the said synchronization anomaly cue at least from the contents of the mode cue.

28. Device according to claim 25, wherein the first synchronism monitoring means comprise, for each input port, first elementary means of detecting modes able to receive the first analysis cue and a read request cue, and to deliver a mode cue as a function of the contents of the first analysis cue and of the read request cue, and first elementary formulating means possessing at least the said main state in which they are able to formulate the said synchronization anomaly cue at least from the contents of the mode cue.

29. Device according to claim 28, wherein the elementary formulating means are able, in the said main state, to generate a first logic signal representative of a prompt or otherwise for disabling the internal operation of the processing unit as a function of the contents of the mode cue, and a second logic signal representative of a prompt or otherwise for disabling reading in the relevant input port as a function of the contents of the mode cue, and in that the synchronism monitoring means comprise generating means, linked between the output of the elementary formulating means and an input terminal for disabling the processing unit, which are able to generate a logic signal for disabling the internal operation of the processing unit from the set of first logic signals.

30. Device according to claim 29, further comprising, for each input port, where p is greater than or equal to one:

- p levels of pipeline registers connected between the output of the elementary formulating means and the input terminal for disabling the processing unit,
- p latchable cascaded registers for storing request cues, connected between the output of the first control means and the input of the elementary mode detection means by way of a first multiplexer with p+1 inputs,
- p latchable cascaded registers for storing incoming cues, connected between the output of the input port and the processing unit by way of a second multiplexer with p+1 inputs,
- wherein the elementary formulating means furthermore possess p families of auxiliary states, the main state and the families of auxiliary states being indexed and ordered, and comprise a state register able to deliver an index signal identifying the current state of the elementary formulating means,
- and wherein the first and second multiplexers are controlled by the index signal,
- and wherein the elementary formulating means generate in the main state and in each auxiliary state family, from the mode cue, from the logic signal for disabling the internal operation of the processing unit, and from the index signal, the first logic signal representative of a prompt or otherwise for disabling the internal operation of the processing unit, the second logic signal representative of a prompt or otherwise for disabling reading in the relevant input port, a third logic signal making it possible to latch or otherwise the p registers for storing request cues, a fourth logic signal making it possible to latch or otherwise the p registers for storing incoming cues, and a new value (Ix) of the states register.

31. Device according to claim 30, wherein in the said main state of the elementary formulating means, and in the absence of the logic signal for disabling the internal operation of the processing unit, the third and fourth logic signals are inactive.

32. Device according to claim 30, wherein in the said main state of the elementary formulating means, and in the presence of the logic signal for disabling the internal operation of the processing unit, the third and fourth logic signals are active, whilst the first logic signal and the second logic signal are active or inactive as a function of the mode cue.

33. Device according to claim 30, wherein the value of the index signal being representative of the said main state, the elementary formulating means confer on the state register the value of the first index of the family of auxiliary states in the presence of a first active logic signal and in the presence of an inactive disabling logic signal, are then able to confer successively on the states register the values of the following indices until the index p-k is reached in p clock cycles, k being the number of times that the logic signal for disabling the internal operation of the processing unit will have been active in the course of the p cycles, and are then able to confer successively on the state register the values of the previous indices until the index representative of the main state is reached again.

34. Device according to claim 31 wherein in the said main state of the elementary formulating means, and in the presence of the logic signal for disabling the internal operation of the processing unit, the third and fourth logic signals are active, whilst the first logic signal and the second logic signal are active or inactive as a function of the mode cue.

35. Device according to claim 31, wherein the value of the index signal being representative of the said main state, the elementary formulating means confer on the state register the value of the first index of the family of auxiliary states in the presence of a first active logic signal and in the presence of an inactive disabling logic signal, are then able to confer successively on the states register the values of the following indices until the index p-k is reached in p clock cycles, k being the number of times that the logic signal for disabling the internal operation of the processing unit will have been active in the course of the p cycles, and are then able to confer successively on the state register the values of the previous indices until the index representative of the main state is reached again.

36. Device according to claim 32, wherein the value of the index signal being representative of the said main state, the elementary formulating means confer on the state register the value of the first index of the family of auxiliary states in the presence of a first active logic signal and in the presence of an inactive disabling logic signal, are then able to confer successively on the states register the values of the following indices until the index p-k is reached in p clock cycles, k being the number of times that the logic signal for disabling the internal operation of the processing unit will have been active in the course of the p cycles, and are then able to confer successively on the state register the values of the previous indices until the index representative of the main state is reached again.

37. Device for monitoring the time synchronization between a processing unit and exterior processing means, comprising

- at least one output port connected between the processing unit and the exterior means and intended to receive from the processing unit and in tempo with the internal clock signal of this processing unit, an outgoing stream of outgoing cues comprising outgoing cues of data temporally separated by outgoing cues for so-called separation, according to a predetermined scheme for outgoing separation,
- second control means which formulate, at each cycle of the said internal clock, a write request cue representative for the output port, of the absence or of the presence of an actual request for writing an outgoing cue in the output port, this outgoing cue possibly being, according to the predetermined scheme for outgoing separation, an outgoing datum cue or an outgoing separation cue,
- second analysis means for delivering a second analysis cue representative of the read-available contents of the output port, second synchronism monitoring means able to formulate a synchronization anomaly cue in the presence of at least one actual request for writing an outgoing cue in the output port, and which is associated with a write unavailability in this output port.

38. Device according to claim 37, further comprising a plurality of output ports connected between the processing unit and the exterior means and intended to receive respectively from the processing unit and in tempo with the internal clock signal of this processing unit, outgoing streams of outgoing cues, comprising outgoing cues of data temporally separated by outgoing cues for so-called separation, according to respective predetermined schemes for outgoing separation, in that the second control means formulate, at each cycle of said internal clock, a plurality of write request cues, each representative for each corresponding output port, of the absence or of the presence of an actual request for writing an outgoing cue in the corresponding output port, this outgoing cue possibly being, according to the respective predetermined scheme for outgoing separation, an outgoing datum cue or an outgoing separation cue, wherein the second analysis means deliver a second analysis cue representative of the read-available contents of each output port, and wherein the second synchronism monitoring means are able to formulate a synchronization anomaly cue in the presence of at least one actual request for writing an outgoing cue in an output port, and which is associated with a write unavailability in this relevant output port.

39. Device according to claim 38, wherein the second analysis means deliver a cue representative of the availability or otherwise in write mode of an output port by comparing the fill level with a chosen threshold.

40. Device according to claim 37, wherein the second analysis means deliver a cue representative of the availability or otherwise in write mode of an output port by comparing the fill level with a chosen threshold.

41. Device according to claim 40, wherein the second monitoring means are able in the presence of at least one signal prompting disabling of the internal operation of the processing unit, to disable the internal operation of the processing unit, and to disable writing in all the output ports.

42. Device according to claim 37, wherein the input ports comprise memories of the first-in first-out type.

43. Device for monitoring the time synchronization between a processing unit and exterior processing means, comprising
at least one input port connected between the processing unit and the exterior means and intended to receive from the exterior means a clocked incoming stream of incoming cues, comprising incoming cues of data temporally separated by incoming cues for so-called separation, according to a predetermined scheme for incoming separation;
first control means formulating at each cycle of the said internal clock, a read request cue representative for the input port, on the one hand of the absence or of the presence of an actual request for reading an incoming cue in the input port and, on the other hand of the nature of the incoming cue possibly requested by the said unit having regard to the scheme for incoming separation;
first analysis means for delivering a first analysis cue, representative of the read-available contents of the input port;
first synchronism monitoring means, linked to the first analysis means and to the input port, and possessing at least one main state in which they are able to formulate a synchronization anomaly cue, in the presence of at least one actual request for reading an incoming cue in the input port, and which is associated with an absence of an available incoming cue in this input port, or in the presence of an available incoming cue of a different nature from that defined by the said corresponding actual read request;
at least one output port connected between the processing unit and the exterior means and intended to receive from the processing unit and in tempo with the internal clock signal of this processing unit, an outgoing stream of outgoing cues comprising outgoing cues of data temporally separated by outgoing cues for so-called separation, according to a predetermined scheme for outgoing separation,
second control means which formulate, at each cycle of the said internal clock, a write request cue representative for the output port, of the absence or of the presence of an actual request for writing an outgoing cue in the output port, this outgoing cue possibly being, according to the predetermined scheme for outgoing separation, an outgoing datum cue or an outgoing separation cue,
second analysis means for delivering a second analysis cue representative of the read-available contents of the output port,
second synchronism monitoring means able to formulate a synchronization anomaly cue in the presence of at least one actual request for writing an outgoing cue in the output port, and which is associated with a write unavailability in this output port.

44. Device according to claim 43, wherein the input ports comprise memories of the first-in first-out type.

45. Device according to claim 25, wherein the input ports comprise memories of the first-in first-out type.

46. Process for monitoring the time synchronization between a processing unit and an exterior processor, the exterior processor delivering to the processing unit, by way of an input port, at least one clocked incoming stream of incoming cues, comprising:
generating a read request cue for controlling the processing unit by a first control mechanism in response to the incoming stream;
analyzing the read-available contents of the input port after a read request cue is generated; and
formulating a synchronization anomaly cue when at least one actual request for reading an incoming cue is read in the input port.

47. The process of claim 46, wherein the incoming stream comprises data cues and separation cues.

48. The process of claim 46, wherein the read request cue comprises a signal of an absence of an actual request for reading the incoming stream, a signal of a presence of an actual request for reading the incoming stream, or a signal of a type of incoming data steam requested by the processing unit.

49. The process of claim 46, wherein the synchronization anomaly cue is generated in the event of an absence of a read-available incoming cue or in the presence of a read-available cue that differs from the read request cue.

50. The device of claim 49, wherein the incoming stream comprises data cues and separation cues.

51. The process of claim 49, wherein the read request cue comprises a signal of an absence of an actual request for reading the incoming stream, a signal of a presence of an actual request for reading the incoming stream, or a signal of a type of incoming data steam requested by the processing unit.

52. The process of claim 49, wherein the synchronization monitor is configured to formulate the synchronization anomaly cue in the event of an absence of a read-available incoming cue or in the presence of a read-available cue that differs from the read request cue.

53. Device for monitoring time synchronization between a processing unit and an exterior processor, comprising an input port connected between the processing unit and the exterior processor, the input port configured to receive from the exterior processor a clocked incoming stream of incoming cues during use;

a first controller formulating, during use, and at each cycle of the internal clock, a read request cue;

a first analyzer for delivering a first analysis cue during use, the first analysis cue representing the read-available contents of the input port during use; and a first synchronism monitor, linked to the first analyzer and to the input port, the first synchronism monitor configured to formulate, during use, a synchronization anomaly cue in the presence of at least one actual request for reading an incoming cue in the input port.

\* \* \* \* \*

UNITED STATES PATENT AND TRADEMARK OFFICE
CERTIFICATE OF CORRECTION

PATENT NO. : 6,324,591 B1  
DATED : November 27, 2001  
INVENTOR(S) : Frëdëric Dufal, Pierre-René Rogel and Michel Remy It is certified that error appears in the above-identified patent and that said Letters Patent is hereby corrected as shown below:

<u>Title page,</u>  
Assignee, after "France Telecom" please insert -- and TELEDIFFUSION DE FRANCE --.

Signed and Sealed this

Ninth Day of July, 2002

Attest:

Attesting Officer

JAMES E. ROGAN  
*Director of the United States Patent and Trademark Office*